Jan. 16, 1940.  M. LAZOW  2,187,610
HANDLE SUPPORTING MECHANISM
Filed July 6, 1938
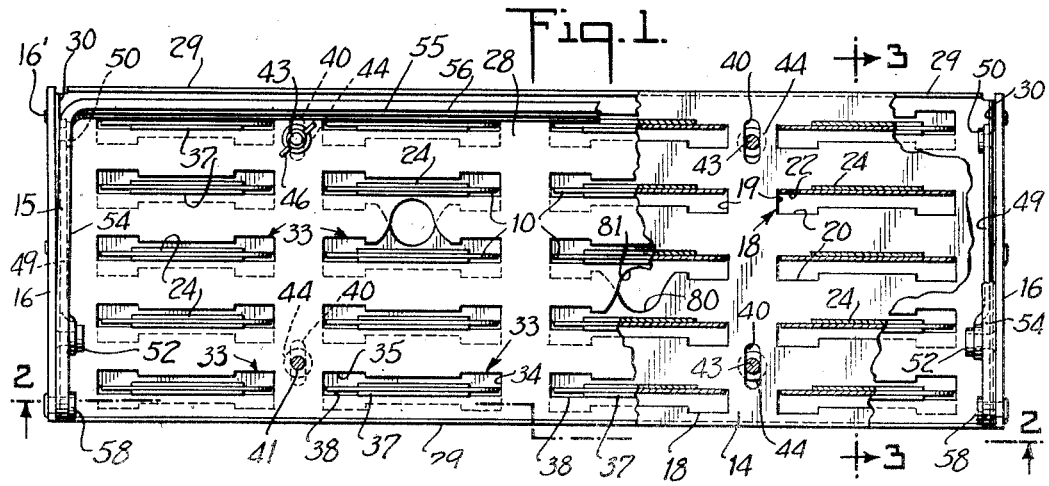
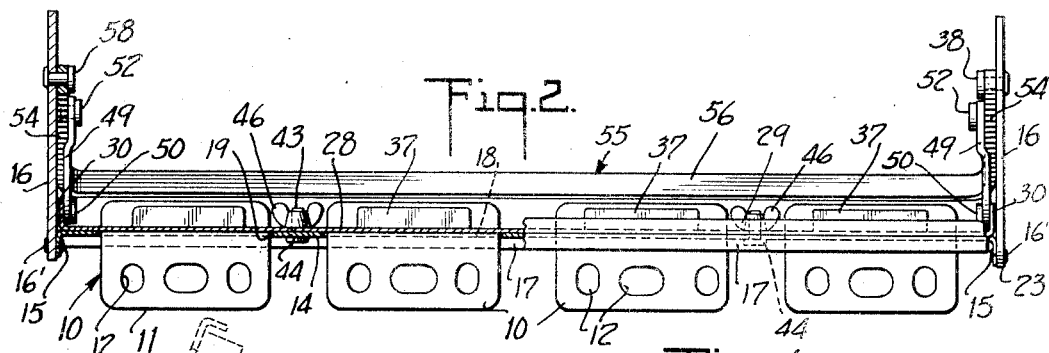
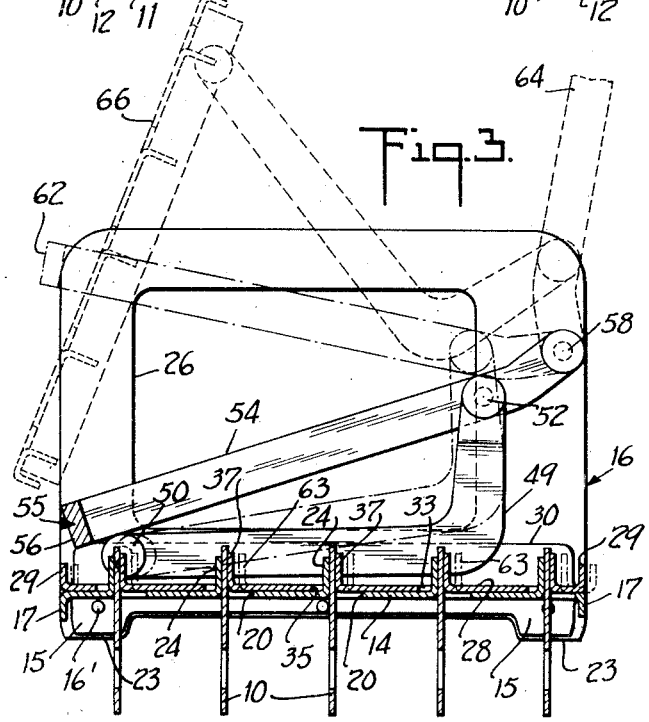
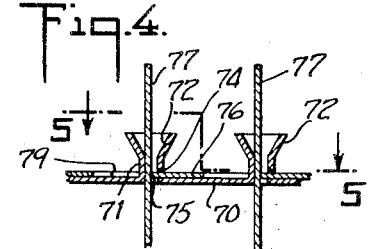
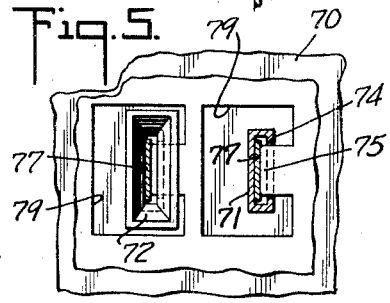
INVENTOR
*Morris Lazow*
BY
*John P. Chandler*
his ATTORNEY Patented Jan. 16, 1940

2,187,610

UNITED STATES PATENT OFFICE 2,187,610

HANDLE SUPPORTING MECHANISM

Morris Lazow, Brooklyn, N. Y.

Application July 6, 1938, Serial No. 217,783

4 Claims. (Cl. 294—87)

This invention relates primarily to an improved device for supporting holders or handles for individual portions of ice cream or other frozen confections during the freezing operation of such confections.

The usual process employed in the commercial preparation of individual portions of ice cream and the like consists in the steps of partially freezing the mixed ingredients in a large receptacle, then pouring such partially frozen mass into a plurality of individual molds, and then inserting sticks or holders into the mass so contained within the molds, after which the freezing is completed in a suitable refrigeration chamber. The handle or stick supporting mechanism normally comprises a plate having apertures therein positioned relative to the individual molds which are suitably mounted in a frame. This plate is positioned in the upper end of the frame and the holders are inserted through such apertures and are then secured in place for the duration of the freezing operation by retractable fingers or the like.

After the freezing operation the frame containing the molds is placed in hot water in order to loosen the portions of ice cream and the stick handling mechanism is then withdrawn upwardly from the frame, and carrying the individual portions of ice cream which are now securely mounted upon the holders or sticks. In order to expedite the process of securing and releasing the holders, the individual fingers or holder-engaging elements are usually mounted on a common support, which may be a movable frame or plate positioned on the upper surface of the aforementioned apertured plate, and after the portions of ice cream have been removed from the molds and the same are to be wrapped, the holders are released from their supporting structure by moving the retractable frame or plate relative to the apertured plate.

Devices of this general character have been objectionable for the reason that they could not be properly cleaned or sterilized inasmuch as the movable member containing the holder engaging fingers was in intimate contact with the upper surface of the apertured plate and these two meeting surfaces always accumulated a considerable amount of dirt which could not be removed even though the structure was placed in boiling water.

It is one of the objects of the present invention to provide an improved device of this type wherein the movable member is connected with the stationary aperture member by means of links or the like and wherein when the entire holder supporting mechanism is to be cleaned after the freezing operation, the movable plate may be quickly and easily released from contact with the stationary plate in order that all surfaces of both plates may be exposed and subjected to effective cleaning.

Another object of the present invention is the provision of an improved holder supporting mechanism for use in connection with the preparation of individual portions of ice cream which will insure positive positioning of the holders and which will provide an improved rigid support therefor for the duration of the freezing operation.

Still a further object of the invention is the provision of an improved mechanism for supporting a new and novel type of handle for individual portions of ice cream, such handle being flat and being substantially rectangular in shape, one of the longitudinal edges of such handle constituting the upper edge thereof, as distinguished from the conventional flat elongated stick currently in use. It will be understood, however, that the present invention is not limited to a device for holding a confection support of this shape, and a modified mechanism for supporting this conventional type of stick is also described and illustrated in the drawing.

Yet another object of the invention is the provision of a handle supporting mechanism, the lower surface of which is substantially flat and free from projections of any kind, excepting the flanges around the marginal edges thereof, thereby making a more sanitary structure than conventional devices of this character.

In the drawing:

Fig. 1 is a top plan view of the preferred embodiment of the present invention, a portion thereof being broken away;

Fig. 2 is a longitudinal vertical section taken on line 2—2 of Fig. 1;

Fig. 3 is a transverse section taken on line 3—3 of Fig. 1;

Fig. 4 is a broken vertical section taken through a slightly modified form of structure; and Fig. 5 is a broken top plan view of the device shown in Fig. 4.

The preferred embodiment of the present invention is adapted to support a plurality of handles of the type illustrated in Fig. 2, such handles being designated by the reference numeral 10 and being made from flat, heavy cardboard and being substantially rectangular in shape. One of the longitudinal edges 11 thereof constitutes the upper edge of the structure when in use, and the entire upper portion of such handle is inserted into an elongated mold (not shown) which contains the partially frozen mixture. This handle structure is further illustrated as being provided with a plurality of apertures 12 which aid in securing the handle within the frozen confection.

The structure comprises a substantially rectangular base plate 14 which is provided with downwardly depending flanges 15 at opposite ends thereof to which are secured vertical end plates 16 of somewhat heavier metal than the plate 14, rivets 16' so securing the plate 16 to the flanges 15. The base plate is further provided with downwardly depending flanges 17 along the two longitudinal edges thereof. This plate 14, together with the end plates 16, are of such size as to fit within the upper end of a mold supporting device which is not illustrated, such mold supporting device having a plurality of individual ice cream molds mounted in suitably spaced relation. The mold supporting device is normally flanged around the upper edge thereof, and the plate 14 is inserted within this flanged area, the leg portions 23, integrally formed with end plates 16, resting upon the upper surface of the frame.

The present device is adapted to support twenty of the flat elongated handles arranged in five spaced rows, each row having four spaced handle supporting structures. The base plate 14 is thus formed with twenty elongated apertures 18, each of which is formed with relatively narrow transverse edges 19, a longitudinal edge 20, and another longitudinal edge 22 opposite thereto. There is formed along this edge 22 in the center thereof and extending the greater portion of its length an integral, upstanding portion constituting a stationary handle supporting element 24. The end plates 16 are shown in detail in Fig. 3 and are substantially rectangular in shape and are provided with a central aperture 26 in order to reduce the weight thereof.

Upon the upper surface of the base plate 14 there is positioned a transversely movable plate 28 which is of substantially the same size as that of the base plate 14, such plate being formed with upwardly turned flanges 29 along its two longitudinal edges and flanges 30 along its two transverse edges. This upper plate is likewise formed with a plurality of spaced apertures 33 of substantially the same size and shape as the apertures 18, such apertures 33 also having transverse edges 34, longitudinal edges 35, and an integrally formed upstanding element 37 along the opposite edge 38, such upstanding portion being desirably of the same length as that of the complementary portion 24 in the base plate. The base plate is provided with a plurality of transversely disposed elongated slots 40, and the movable plate 38 is formed with a plurality of circular apertures 41 positioned relative to these slots 40, and a bolt 43 having a flat head 44 at the lower end thereof passes through these aligned apertures, the upper end of the bolt having a wing nut 46 thereon. Thus it will be obvious that the upper plate 28 may move transversely of the base plate 14 within the limits of the elongated slots 40. When the upper plate is moved to the left in the position shown in Fig. 3, the vertical holder engaging portions 37, integral therewith, move in the direction of the vertical portions 24 of the base plate which pass through the apertures 33 in such upper plate and thereby engage the handle members. It is obvious, then, that as the upper plate is moved in the opposite direction, the handles are released.

The following means are provided for causing movement of the upper or movable plate 28 relative to the lower plate. A substantially L-shaped link 49 is pivotally secured at 50 to the flange 30 at each end of the movable plate. At its opposite end this link is pivotally secured at 52 adjacent to the inner terminal of the end portions 54 of a substantially U-shaped lever 55 having a central portion 56 which extends the full length of the device. This lever is pivotally secured at 58 to the end walls 16 secured to the base plate. Thus it will be obvious that as this lever is moved downwardly it forces the forward end of the horizontal portion of the L-shaped link forwardly, thereby moving the upstanding portions 37 on the movable plate in the direction of the upstanding portions 24 in the stationary plate, and when the handle members 10 are positioned therein, as shown in Fig. 1, such handle members will be firmly secured between the stationary and movable upstanding portions 24 and 37 respectively. When it is desired to release the handles, the lever is moved upwardly, thereby moving the upstanding portions 37 on the movable plate away from such stationary portions 24.

The handle portion 54 of the lever 55 is shown in its maximum downward position in full lines in Fig. 3. In this position the handles 10 are firmly secured between the upstanding handle engaging portions 24 and 37. When the handle is moved upwardly to the position shown at 62 in Fig. 3, the L-shaped link is drawn backwardly, thereby positioning the upstanding portions 37 as shown at 63 in Fig. 3. When, however, it is desired to clean the entire device, the wing nuts 46 are removed from the bolts 43 and the handle 56 drawn upwardly to the position shown at 64 in Fig. 3, wherein the upper plate 28 may assume the position shown at 66 in Fig. 3. In this position it will be obvious that all of the parts of the device may be exposed to a cleaning operation and no accumulation of dirt is possible.

The modification of the device shown in Figs. 4 and 5 is similar to the preferred embodiment, except that it is adapted to receive handles of the long, narrow type conventionally used in other types of ice cream confections. This structure includes a lower or base plate 70, provided with an upstanding portion 71 having outwardly flared edges 72, the upstanding portion being substantially rectangular in horizontal section, as shown in Fig. 5. On one side thereof, a recess 74 is formed and a projection 75 in the upper plate 76 is adapted to move into this projection by actuating the upper plate, all to the end of securing the elongated handle 77 in place. It will be appreciated, of course, that the upper plate 76 is provided with a plurality of suitable apertures 79 through which the upstanding portions 71 and their outwardly flared upper ends 72 may pass when the upper plate is to be removed.

What I claim is:

1. A device for supporting a plurality of handles for frozen confections during the freezing operation, the device being adapted to be positioned on a frame supporting a plurality of molds in spaced relation, such device comprising a substantially rectangular base plate having a plurality of apertures therein positioned relative to the molds in said frame, the material cut from the metal to form such apertures being upwardly bent to form vertical stationary handle supporting elements, a second plate positioned upon and being transversely movable relative to said base plate, the movable plate also having a plurality of apertures therein through which the handle supporting elements pass, the material from said apertures likewise being upwardly bent to form movable handle supporting elements, link connections between the upper and lower plates for moving one relative to the other, and means for removing the upper plate from engagement with the lower plate when the device is to be cleaned.

2. A device for supporting a plurality of handles for frozen confections during the freezing operation, the device being adapted to be positioned on a frame supporting a plurality of molds in spaced relation, such device comprising a substantially rectangular base plate having a plurality of apertures therein positioned relative to the molds in said frame, the material cut from the metal to form such apertures being upwardly bent to form vertical stationary handle supporting elements, a second plate positioned upon and being transversely movable relative to said base plate, the movable plate also having a plurality of apertures therein through which the handle supporting elements pass, the material from said apertures likewise being upwardly bent to form movable handle supporting elements, the upper and lower plates having complementary slots therein and bolts removably positioned within said slots, the upper plate being movable transversely of and relative to the lower plate within the limits of movement of the bolt within the slots, and link connections between the plates to move one relative to the other in order to secure and release said handles.

3. A device for supporting a plurality of handles for frozen confections during the freezing operation, the device being adapted to be positioned on a frame supporting a plurality of molds in spaced relation, such device comprising a substantially rectangular base plate having a plurality of apertures therein positioned relative to the molds in said frame, the material cut from the metal to form such apertures being upwardly bent to form vertical stationary handle supporting elements, a second plate positioned upon and being transversely movable relative to said base plate, the movable plate also having a plurality of apertures therein through which the handle supporting elements pass, the material from said apertures likewise being upwardly bent to form movable handle supporting elements, the two plates being provided with means for limiting the transverse movement of one plate relative to the other, such means being removable to permit one plate to be separated from the other during cleaning operations, and link connections between the plates for causing movement of the upper plate relative to the lower for detachably securing and releasing said handles.

4. A device for supporting a plurality of flat, elongated handles for frozen confections during the freezing operation, the device being adapted to be positioned on a frame supporting a plurality of molds in spaced relation, said device comprising a flat, substantially rectangular base plate made from sheet metal or the like, the opposed transverse terminal portions being bent at right angles to the plate, substantially rectangular, vertical handle members secured to such terminal portions, the base plate having a plurality of longitudinally disposed, spaced apertures therein, the material cut from the plate to form such apertures being upwardly bent to form stationary handle supporting elements, a second plate mounted on the first and having complemental apertures therein, the material cut from the plate to form such apertures being likewise upwardly bent along their opposed edges to form movable handle supporting elements, the plates having complemental apertures therein and removable screws passing through each pair of apertures, the apertures being of sufficient size to permit transverse movement of one plate relative to the other while maintaining surface contact between the two plates, a lever pivotally mounted on the handle member and a link connecting such lever with the upper plate, whereby manual movement of the lever will cause relative movement of the handle supporting elements toward and away from each other.

MORRIS LAZOW.